US012418794B2

(12) United States Patent
Beveridge et al.

(10) Patent No.: US 12,418,794 B2
(45) Date of Patent: Sep. 16, 2025

(54) MOBILE DEVICE AUTHENTICATION

(71) Applicant: Omnissa, LLC, Mountain View, CA (US)

(72) Inventors: Daniel James Beveridge, Apollo Beach, FL (US); Blake Watts, St. George, UT (US); Jian Mu, BeiJing (CN)

(73) Assignee: Omnissa, LLC, Mountain View, CA (US)

( * ) Notice: Subject to any disclaimer, the term of this patent is extended or adjusted under 35 U.S.C. 154(b) by 834 days.

(21) Appl. No.: 15/175,927

(22) Filed: Jun. 7, 2016

(65) Prior Publication Data

US 2016/0342784 A1 Nov. 24, 2016

Related U.S. Application Data

(63) Continuation-in-part of application No. 14/686,769, filed on Apr. 14, 2015, now Pat. No. 10,827,004.

(Continued)

(51) Int. Cl.
*H04W 12/06* (2021.01)
*G06F 9/451* (2018.01)
(Continued)

(52) U.S. Cl.
CPC .......... *H04W 12/06* (2013.01); *G06F 9/452* (2018.02); *G06F 21/34* (2013.01); *G06F 21/35* (2013.01);
(Continued)

(58) Field of Classification Search
CPC .......... G06F 21/34; G06F 21/35; G06F 21/32; G06F 9/452; H04L 63/0853; H04L 67/36; H04L 67/08; H04W 12/06
See application file for complete search history.

(56) References Cited

U.S. PATENT DOCUMENTS 4,467,421 A 8/1984 White
7,117,243 B2 10/2006 Peart
(Continued)

FOREIGN PATENT DOCUMENTS

JP 08-212187 8/1996
JP 2006-081159 3/2006
(Continued)

OTHER PUBLICATIONS

Clover, Juli, "Apple Working on OS X 10.12 Feature Allowing Macs to Be Unlocked via iPhone's Touch ID", MacRumors, May 19, 2016, 5 pages.
(Continued)

*Primary Examiner* — John T Repsher, III
(74) *Attorney, Agent, or Firm* — Kim & Stewart LLP

(57) ABSTRACT

A desktop is unlocked or locked using a mobile client device, such as a smart phone, tablet, smart watch, etc. The authentication mechanism of the mobile client device, such as fingerprint, facial recognition, voice recognition, username and password, is leveraged for faster, less-cumbersome user authentication on the desktop. In this vein, a client device is added to an authentication agent on the desktop, and the desktop recognizes successful attempts to access the mobile client device as a method of unlocking or locking the desktop.

22 Claims, 9 Drawing Sheets

Related U.S. Application Data which is a continuation of application No. 13/217,484, filed on Aug. 25, 2011, now Pat. No. 9,009,219.

(60) Provisional application No. 62/211,850, filed on Aug. 30, 2015, provisional application No. 62/211,736, filed on Aug. 29, 2015, provisional application No. 61/508,404, filed on Jul. 15, 2011.

(51) Int. Cl.
*G06F 21/32* (2013.01)
*G06F 21/34* (2013.01)
*G06F 21/35* (2013.01)
*H04L 9/40* (2022.01)
*H04L 67/08* (2022.01)
*H04L 67/75* (2022.01)

(52) U.S. Cl.
CPC .......... *H04L 63/0853* (2013.01); *H04L 67/08* (2013.01); *H04L 67/75* (2022.05); *G06F 21/32* (2013.01)

(56) References Cited

U.S. PATENT DOCUMENTS

| | | | |
|---|---|---|---|
| 7,181,578 | B1 | 2/2007 | Guha et al. |
| 7,184,764 | B2 | 2/2007 | Raviv et al. |
| 7,325,040 | B2 | 1/2008 | Truong |
| 7,606,868 | B1 | 10/2009 | Le et al. |
| 7,669,020 | B1 | 2/2010 | Shah et al. |
| 7,941,470 | B2 | 5/2011 | Le et al. |
| 8,027,354 | B1 | 9/2011 | Portolani |
| 8,112,748 | B2 | 2/2012 | Pomerantz |
| 8,234,236 | B2 | 7/2012 | Beaty |
| 8,261,268 | B1 | 9/2012 | Forgette |
| 8,266,311 | B2 | 9/2012 | Virdi et al. |
| 8,271,528 | B1 | 9/2012 | Wilkinson et al. |
| 8,356,084 | B2 | 1/2013 | Yamamoto |
| 8,396,452 | B1* | 3/2013 | Matsuoka ............ H04W 12/08 455/410 |
| 8,433,802 | B2 | 4/2013 | Head et al. |
| 8,494,576 | B1* | 7/2013 | Bye ................ G07C 9/00571 455/550.1 |
| 8,555,274 | B1 | 10/2013 | Chawla et al. |
| 9,009,219 | B2 | 4/2015 | Chawla et al. |
| 9,075,979 | B1* | 7/2015 | Queru ............... H04W 12/0605 |
| 9,509,676 | B1* | 11/2016 | Johnson ............. H04W 12/065 |
| 2003/0195950 | A1 | 10/2003 | Huang et al. |
| 2006/0080397 | A1 | 4/2006 | Chene et al. |
| 2006/0128305 | A1* | 6/2006 | Delalat ............. G08B 13/1418 455/41.2 |
| 2007/0174410 | A1 | 7/2007 | Croft et al. |
| 2007/0180493 | A1 | 8/2007 | Croft et al. |
| 2007/0186212 | A1 | 8/2007 | Mazzaferri et al. |
| 2007/0192329 | A1 | 8/2007 | Croft et al. |
| 2007/0198656 | A1 | 8/2007 | Mazzaferri et al. |
| 2007/0204011 | A1 | 8/2007 | Shaver et al. |
| 2007/0260702 | A1 | 11/2007 | Richardson et al. |
| 2008/0034071 | A1 | 2/2008 | Wilkinson et al. |
| 2008/0250424 | A1 | 10/2008 | Brugiolo et al. |
| 2008/0281798 | A1 | 11/2008 | Chatterjee et al. |
| 2008/0320583 | A1 | 12/2008 | Sharma et al. |
| 2009/0006537 | A1 | 1/2009 | Palekar et al. |
| 2009/0094523 | A1 | 4/2009 | Treder et al. |
| 2009/0216975 | A1 | 8/2009 | Halperin et al. |
| 2009/0235358 | A1 | 9/2009 | Tolba |
| 2009/0240904 | A1 | 9/2009 | Austruy et al. |
| 2009/0276475 | A1* | 11/2009 | Ramsey ............... H04L 63/083 |
| 2010/0070870 | A1 | 3/2010 | Halperin et al. |
| 2010/0070978 | A1 | 3/2010 | Chawla et al. |
| 2010/0114867 | A1 | 5/2010 | Olston |
| 2010/0131654 | A1 | 5/2010 | Malakapalli et al. |
| 2010/0131949 | A1 | 5/2010 | Ferris |
| 2010/0191783 | A1 | 7/2010 | Mason |
| 2010/0199276 | A1 | 8/2010 | Umbehocker |
| 2010/0211944 | A1 | 8/2010 | Kaneda |
| 2010/0268813 | A1 | 10/2010 | Pahlavan et al. |
| 2010/0269152 | A1 | 10/2010 | Pahlavan et al. |
| 2010/0274784 | A1 | 10/2010 | Acharya |
| 2011/0004680 | A1 | 1/2011 | Ryman |
| 2011/0066668 | A1 | 3/2011 | Guarraci |
| 2011/0099297 | A1 | 4/2011 | Hayton |
| 2011/0119668 | A1 | 5/2011 | Calder et al. |
| 2011/0153716 | A1 | 6/2011 | Malakapalli et al. |
| 2011/0184993 | A1 | 7/2011 | Chawla |
| 2011/0185292 | A1 | 7/2011 | Chawla et al. |
| 2011/0185355 | A1 | 7/2011 | Chawla et al. |
| 2011/0209064 | A1 | 8/2011 | Jorgensen et al. |
| 2011/0225426 | A1* | 9/2011 | Agarwal ................ G06F 21/41 713/175 |
| 2012/0023558 | A1* | 1/2012 | Rafiq ..................... H04L 63/08 726/6 |
| 2012/0216260 | A1* | 8/2012 | Crawford ............... G06F 21/31 726/5 |
| 2013/0018939 | A1 | 1/2013 | Chawla et al. |
| 2013/0191902 | A1* | 7/2013 | Friedl ..................... G06F 21/41 726/7 |
| 2014/0189808 | A1* | 7/2014 | Mahaffey ............ H04L 63/0853 726/4 |
| 2014/0270127 | A1* | 9/2014 | Becker ..................... H04M 1/67 379/194 |
| 2014/0308930 | A1* | 10/2014 | Tran ....................... H04W 4/001 455/414.1 |
| 2014/0372762 | A1* | 12/2014 | Flautner .................. H04L 63/08 713/173 |
| 2015/0028996 | A1* | 1/2015 | Agrafioti ................ G06F 21/34 340/5.82 |
| 2015/0186636 | A1* | 7/2015 | Tharappel ............... G06F 21/32 726/8 |
| 2015/0257004 | A1* | 9/2015 | Shanmugam ....... H04W 12/065 455/411 |
| 2015/0295901 | A1* | 10/2015 | Woodward ............ H04W 12/06 713/168 |
| 2015/0326578 | A1* | 11/2015 | Hsu ........................ H04L 63/10 726/9 |
| 2015/0347738 | A1* | 12/2015 | Ulrich .................... G06F 21/35 726/17 |
| 2016/0048705 | A1* | 2/2016 | Yang ...................... H04W 12/06 726/34 |
| 2016/0224779 | A1* | 8/2016 | Kitane ................... G06F 21/35 |
| 2016/0246341 | A1* | 8/2016 | Burrell ..................... G06F 1/26 |

FOREIGN PATENT DOCUMENTS

| | | |
|---|---|---|
| JP | 2008-511931 | 4/2008 |
| JP | 2009-230253 | 10/2009 |

OTHER PUBLICATIONS

European Patent Office, International Search Report and Written Opinion for PCT/US2010/046377, transmitted on Jan. 30, 2013, 11 pages.

Quickoffice, Inc., QuickOffice Pro for iPhone and iPod Touch, Version 4.0.0, User Help Guide; Jan. 1, 2010, 42 pages.

Tedd Fox, Citrix Received >> XenApp—Citrix Community, http://community.citrix.com/display/xa/Citrix+Receiver, Aug. 13, 2010.

John McBride et al., Project GoldenGate >> XenApp—Citrix Community, http:/community.citrix.com/display/xa/Project+GoldenGate, Jul. 1, 2011.

Office Action received in copending Australian Patent Application No. 2012284345, Received Feb. 18, 2015, 3 pages.

Japanese Office Action received in Japanese Patent Application No. 2014-520299. Received Dec. 1, 2015. 6 Pages.

\* cited by examiner ly authentication devices available for quickly logging into or out of mobile client devices, very few desktops have such capabilities. The cumbersome desktop authentication process is particularly problematic for users who are mobile, or working from more than one terminal during the day. Repetitive unlocking of terminals lead to a frustrating user experience, dissuading users from interacting with the terminals unless the need to do so exceeds the extra steps of the virtual authentication process.

MOBILE DEVICE AUTHENTICATION

CLAIM OF PRIORITY

This application claims the benefit of U.S. Provisional Patent Application Ser. No. 62/211,736, entitled "Mobile Devices in Service of Desktop Uses" filed on Aug. 29, 2015, U.S. Provisional Patent Application Ser. No. 62/211,850, entitled "Mobile Devices in Service of Desktop Uses" filed on Aug. 30, 2015. All of these applications are incorporated herein by reference in their entirety for all intents and purposes. Further, this application is a continuation-in-part to U.S. patent application Ser. No. 14/686,769 entitled "Native Viewer Use for Service Results from a Remote Desktop" filed on Apr. 14, 2015, which is a continuation of U.S. patent application Ser. No. 13/217,484 entitled "Native Viewer Use for Service Results from a Remote Desktop" filed on Aug. 25, 2011, which claims the benefit of U.S. Provisional Patent Application No. 61/508,404 entitled "Native Viewer Use for Service Results from a Remote Desktop" filed on Jul. 15, 2011.

BACKGROUND

Passwords to protect desktop computers are an ongoing barrier to use imposed on users by information technology (IT) departments. Users typically find themselves typing complex usernames and passwords to unlock their desktops over and over throughout the day, spurred in part by aggressive screen-locking policies meant to enhance security. And most IT policies in today's work environments insist that the passwords to be periodically changed, requiring the users to constantly remember their passwords or, even worse, use easy-to-remember passwords that can easily be hacked.

Although there are biometric authentication devices available for quickly logging into or out of mobile client devices, very few desktops have such capabilities. The cumbersome desktop authentication process is particularly problematic for users who are mobile, or working from more than one terminal during the day. Repetitive unlocking of terminals lead to a frustrating user experience, dissuading users from interacting with the terminals unless the need to do so exceeds the extra steps of the virtual authentication process.

SUMMARY

The disclosed examples are described in detail below with reference to the accompanying drawing figures listed below. The below Summary is provided to illustrate some examples disclosed herein, and is not meant to necessarily limit all examples to any particular configuration or sequence of operations.

Some examples are directed to a method for registering a client device with a remote desktop, to facilitate unlocking the desktop. In that example, a client device, such as a mobile phone, with an authentication mechanism (e.g. facial recognition, voiceprint, fingerprint, etc.) is registered with the remote desktop. The authentication mechanism of the client device then receives an indication from the user. If the indication is accepted by the client device, then the remote desktop is locked or unlocked.

Some examples are directed to a system for unlocking a remote desktop using a client device. In those examples the client device includes an agent which transmits a successful authentication from the client device to the remote desktop. The remote desktop also includes an agent which receives the authentication from the client device, and unlocks the remote desktop in response to the indication.

Some examples are further directed to executable instructions which, when executed by a processor, enable remote authentication of a remote desktop using a client device. The instructions register the client device with an agent operating on the remote desktop. After the client device captures an indication that a user is accessing the client device, the authentication is transmitted to the remote desktop. The remote desktop compares the authentication to valid authentications. If the authentication is valid, the user is able to lock or unlock the remote desktop. But if the authentication is invalid, the remote desktop is locked.

Aspects of the disclosure are not limited to these examples. Variations of these examples, as well as additional examples, are contemplated.

This summary introduces a selection of concepts that are described in more detail below. This summary is not intended to identify essential features. Nor is it meant to limit in any way the scope of the claimed subject matter.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
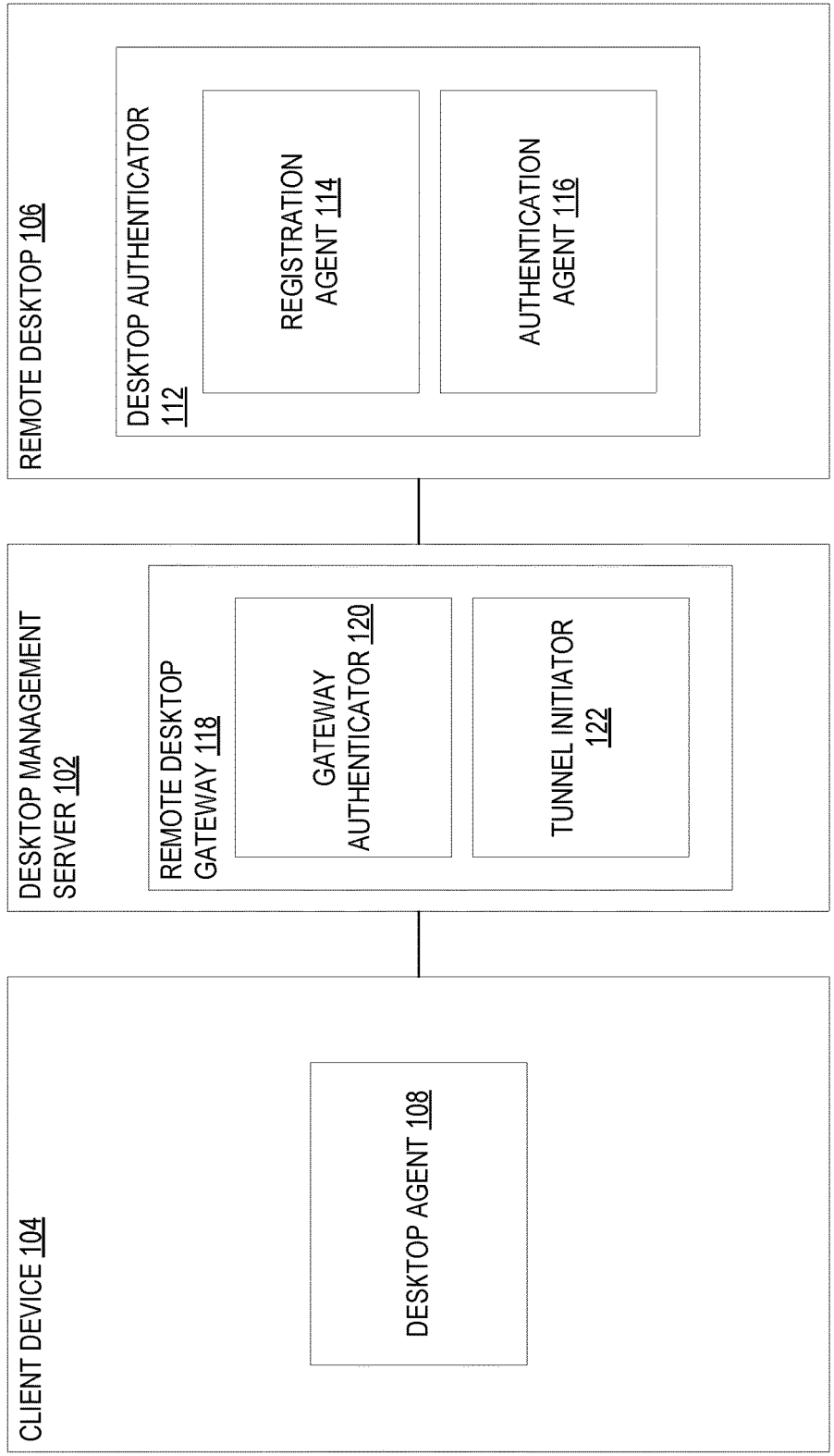
FIG. 1 depicts a system for authenticating a user on a remote desktop by an authentication mechanism on a client device.

Authentication of a desktop through registered mobile devices is much more convenient for unlocking desktops than lengthy, hard-to-remember, and easily hacked passwords/username combinations. Also, mobile devices are easier to use with one hand than standard desktop keyboards, which helps users whose desktops lock while they talk on the phone or users who need to come and go from their cubicle to attend group meetings. The ability to handle desktop locking/unlocking through the mobile device's simpler and more effective authentication tools reduces the security risks caused by users haphazardly writing and exposing passwords on sticky notes attached to desktop monitors, and allows information technology (IT) personnel to implement aggressive screen locking without burdening users to the same degree.

Some of the examples disclosed herein use a lighter-friction authentication mechanisms of a user's mobile device (e.g., a smart phone, tablet, wearable device, etc.) to lock or unlock the user's desktop screen. In some examples, the user can unlock their desktop screen by authenticating themselves to a mobile device registered with the desktop. For example, a user may step away from the desktop for an extended period of time, causing the desktop to lock, and then, upon return, unlock the desktop screen using a fingerprint scanner of the registered smart phone. Virtually any type of biometric scanner, mobile device passcode, username and password combination, gesture recognition mechanism, or other authentication technique on a mobile device may be used to unlock the desktop screen. Examples of biometric scanners include, without limitation, fingerprint scanners, retina scanners, facial scanners, voice recognition, and the like. Gesture recognition software may integrate with a camera on the mobile device to capture and analyze user movements or with a touch screen on the mobile device to analyze the user's sequential touching of specifically displayed elements.

One particular example uses the authentication performed on a user's smart watch (e.g., Samsung Watch, APPLE WATCH, etc.), either directly or through a paired mobile device (e.g., smart phone or mobile tablet), to unlock or lock the screen of a desktop. To do so, some examples use the smart watch communicatively paired with a mobile device (e.g., smart phone or tablet). In such examples, an indication of the user's authentication on the smart watch is transmitted from the watch to the paired mobile device (e.g., smart phone or tablet) and then from the paired mobile device to the desktop, which in turn uses the smart-watch-captured and paired-watch-relayed authentication indication to unlock or lock the desktop screen. For example, a user may use a fingerprint scanner or watch passcode to authenticate the user on an Apple Watch, and the Apple Watch may transmit that authentication to a paired IPHONE that then transmits the indication of the authentication that occurred on the watch to a desktop for unlocking or locking of the desktop's screen. Such an example uses the Apple Watch and the iPhone working together to control the desktop's locking screen; whereby, the iPhone serves as a relay to send the authentication indication captured on the Apple Watch.

Alternatively, the smart watch itself may act as the mobile device and directly transmit an indication of the user's authentication to the desktop—essentially cutting out the other paired mobile device—and the desktop uses the smart-watch-transmitted authentication indication to unlock or lock the desktop screen. The aforementioned examples enable the user to use smart watches (e.g., the Apple Watch) to remotely lock and unlock their desktop screen. Thus, remote locking and unlocking may be done from a wearable device, either with or without a paired smart phone or other mobile device.

While some examples disclosed herein reference using a fingerprint scanner on the mobile device to unlock the desktop, alternative examples may use other types of biometric unlocking mechanisms. For example, the disclosed unlocking mechanisms may unlock the mobile device and desktop using gesture recognition, facial recognition, eye scanning, voice recognition, signature verification, hand geometry, thermograms and other types of heat patterns, lip motion, gait recognition, ear recognition, skin reflection, keystroke recognition, or other type of biometric recognition technique (collectively "biometric unlocking mechanisms").

Additionally, the disclosed embodiments may be used across multiple operating systems (OSes) and are not limited to just one particular OS ecosystem. For example, some of the disclosed embodiments may use the biometric sensor of an APPLE® brand iPHONE® to unlock a WINDOWS® brand OS on a desktop, or a fingerprint scanner of a SAMSUNG® brand GALAXY® phone may be used to unlock an APPLE® brand OS X on a remote desktop. In other words, the disclosed embodiments enable desktop unlocking when the mobile device is executing a different OS than the desktop.

The disclosed mobile desktop authentication system increases the accessibility of desktop systems. Users are not forced to type in cumbersome passwords, but are able to rely on biometric markers or more-commonly-entered mobile device passcodes or usernames and password combinations to access desktops. This provides an additional layer of security.

Having described various examples of this disclosure, attention is directed to the architecture and individual devices configured to perform the desktop authentication through mobile authentication capabilities previously discussed.

FIG. 1 depicts a system for authenticating a user on a remote desktop by an authentication mechanism on a client device. Looking at the accompanying figures, FIG. 1 depicts an exemplary environment for providing desktop services. Users may use a mobile device, which is shown and referred to as client device 104, to interact with a desktop management server 102 to access a user's remote desktop 106. Client device 104 may use a client services interface to have services, such as authentication, performed by remote desktop 106. In some example, data related to authentication collected by the client device 104 is authorized authentication data or an authorized indication. In some examples, this may include any of the aforesaid biometric unlocking mechanisms, e.g., gesture recognition, facial recognition, eye scanning, voice recognition, signature verification, hand geometry, thermograms and other types of heat patterns, lip motion, gait recognition, ear recognition, skin reflection, keystroke recognition, or other type of biometric recognition technique. The data used to authenticate a user is referred to as authentication data or an "indication." An indication is either authorized (e.g., the indication is known and indicates authorized use) or unauthorized. The client services interface may be part of a remote desktop solution allowing access to remote desktop 106.

Client device 104 may send authentication requests to remote desktop 106. Remote desktop 106 may be a physical computer system or a virtualized computer system. Physical desktops may be actual physical machines being controlled remotely. Virtualized desktops may export user interfaces, e.g., keyboard and mouse input, audio and visual output, to the user from virtual machines (VMs) running remotely (in the datacenter) or locally on client device 104, or, in some cases, using a hybrid.

Desktop management server 102 may be an interface layer that includes desktop management software with various functions. Desktop management server 102 (see FIG. 9) includes a connection broker 923, which allows a remote user to select a type of remote desktop 106 (e.g., remote desktop client or client services interface) and initiate a desktop session, or a connection to remote desktop 106 using client device 104. Client device 104 may be a mobile device, such as a cellular phone, smart phone, tablet, personal computer (PC), laptop or other computing device that may have a different form factor than a remote desktop 106. For example, remote desktop 106 may virtualize a screen size that is different from the size of the display provided by access device 104. Additionally, client device 104 may be running a different operating system (OS) with different application characteristics and application programming interfaces (APIs) than remote desktop 106.

Client device 104 includes a desktop agent 108 that communicates with desktop management server 102 or directly to remote desktop 106, which may be hosted remotely or locally by a Type 2 hypervisor running on client device 104. Desktop agent 108 may send service requests to have services performed by the user's remote desktop 106. In an example, a side channel for a remote desktop session may be used to send the requests and receive the result sets. This side channel may be used instead of a channel used to send authentications of remote desktop 106 using client device 104. Desktop management server 102 allows non-display traffic to be sent from desktop agent 108 to remote desktop 106 in the side channel. This process is described in more detail below.

Proxy services agent 206 outputs a result set. The result set may include the result of an authentication attempt on remote desktop 106. Any suitable protocol or API can be implemented for message transmission between client device 104 and desktop management server 102. For example, various web services protocols can be used, and the message payloads may be encrypted and/or compressed.

The user may be authenticated before accessing remote desktop 106. A remote desktop gateway 118 is used to authenticate the user. In one example, a new client services interface (not illustrated) is launched by a user to have services performed. The client services interface may be similar to a remote desktop client in terms of establishing connectivity to remote desktop 106. Although the authentication is described with respect to authenticating the remote desktop 106, in some embodiments, an independent authentication process may be used for establishing a session for having services performed by remote desktop 106 through the remote desktop gateway 118. When the client services interface on client device 104 is launched, client device 104 provides credentials to remote desktop gateway 118. For example, enterprise credentials are provided to authenticate the access for the user to remote desktop 106. A gateway authenticator 304 authenticates the credentials.

Gateway authenticator 304 may use different methods of authenticating the credentials. In one example, based on the administrative policy, the user may be asked to use a two-factor authentication. For example, the user may be required to first provide a Rivest, Shamir, and Adelman (RSA) SECURID® or another token and then provides active directory credentials. In some examples, the administrative policy controls the access to the remote desktop 106 based on criteria established by an administrator. As an example, the client device 104 is prevented from authenticating the remote desktop 106 without a new token, issued daily to authorized client devices 104 by the remote desktop gateway 118. In another example, the remote desktop gateway 118 prevents client device 104 from authenticating remote desktop 112 during certain hours (e.g., after hours of business operation). This authentication process is known and need not be described further.

In alternative embodiments, unlocking of the remote desktop 106 is performed by the desktop agent 108 acting as a pass-through agent for providing identification of the remote desktop 106 by way of a reverse-proxy agent or by way of integration with the desktop agent 108, and thereafter be used to unlock a virtual desktop session. In one specific example, the desktop agent 108 may include a VMWARE HORIZON® branded client that passes through an identifier (e.g., username, media access control (MAC), universally unique identifier (UUID), or the like) of the remote desktop 106 along with the unlocking indication to a cloud service that uses both to unlock a virtual desktop session in a virtual desktop infrastructure (VDI). Going further, in one example, a scenario may involve a user on a home personal computer with a VMWARE HORIZON® branded client accessing a VDI session in a corporate data center. The VMWARE HORIZON® branded client (i.e., the desktop agent 108) may unlock the user's local personal computer and a VDI home screen displayed within a HORIZON VIEW® branded client to access a VDI session in the corporate data center. Thus, the desktop client 108 may be used to not only unlock the user's local personal computer, but also to unlock a VDI home screen. This convenient authentication capability may also be made available within the desktop agent 108 and paired with other virtual desktop capabilities, thereby offering the user a comprehensive augmentation of the desktop experience.

Figure 2:
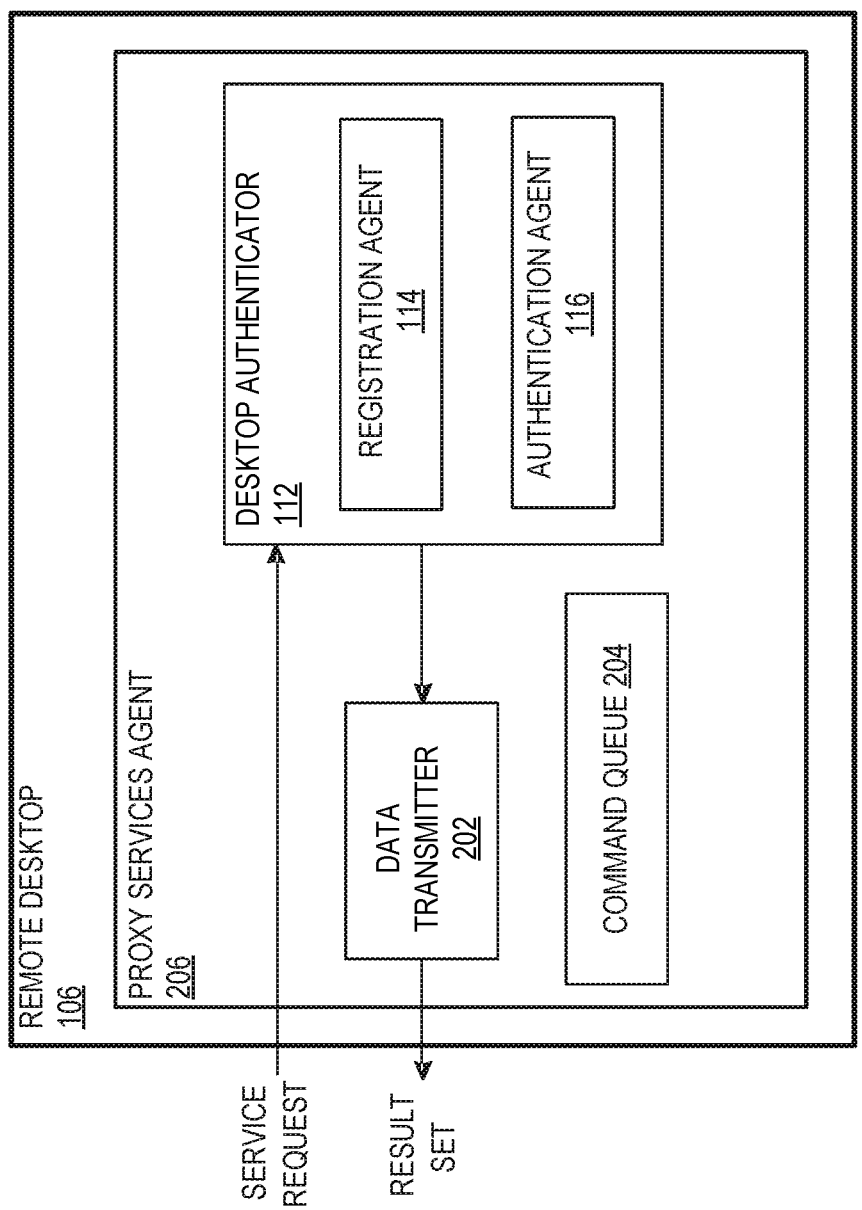
FIG. 2 depicts a more detailed example of the authentication and registration agents, utilized in mobile device authentication, on the remote desktop.

FIG. 2 depicts a more detailed example of the authentication and registration agents, utilized in mobile device authentication, on the remote desktop 106. Within the desktop authenticator 112 are various plug-ins, such as the registration agent 114 a registration agent 114 and an authentication agent 116, within a proxy services agent 206. The proxy services agent 206 also includes a command queue 204 that stores various instructions for remote desktop authentication on the client device 104. As an example, the command queue 204 includes instructions to lock the client device 104 from attempting mobile device authentication upon receiving an invalid unlock attempt. In an example where an invalid unlock attempt is received, an administrator may further be alerted as to the invalid attempt. Additional or alternative plug-ins may be used in various examples. Examples discussed below reference the remote desktop 106 interacting with the client device 104 to enable authentication of the remote desktop 106.

In one example, registration agent 114 registers the client device 104 for locking and unlocking the screen of the remote desktop 106. Authentication agent 116 issues commands to lock and unlock the remote desktop 106 upon notice of successful user authentication (e.g., fingerprint scanning, mobile device passcode entry, voice recognition, retina scan, username and password, gesture recognition, etc.) on the client device 104.

Proxy services agent 206 receives service requests for locking/unlocking the remote desktop 106 through remote authentication by the user. Proxy services agent 206 performs the requested services, optionally, by performing system calls to the operating system running on remote desktop 106. For example, the remote desktop 106 screen may be locked or unlocked by accessing system functions of the operating system on remote desktop 106. Also, applications running on remote desktop 106 may also be queried to perform the services. A result set gathered by proxy service agent 110 and then returned to client device 104. The type of result set may depend on the service performed.

Registration agent 114 registers the client device 104 (e.g., mobile devices) with the remote desktop 106 for mobile device authentication. This process is described in more detail in FIG. 5. To do so, registration agent 114 may identify and store a particular address (e.g., MAC, Internet Protocol (IP), or other device identifiers) of the client device 104 to be used for authentication of the remote desktop 106. Additionally or alternatively, registration agent 114 may register the client device 104 for unlocking and locking the remote desktop 106.

Authentication agent 116 issues lock and unlock commands for the remote desktop 106 upon receipt of authentication command from the client device 104, which is registered with the registration agent 114, to provide remote unlocking functionality. For example, the desktop agent 108 on the client device 104 may be configured to transmit an authentication command upon authentication of a user on the client device 104 (e.g., successful scanning of fingerprint, username and password, facial recognition, input of mobile device passcode, etc.) that causes the authentication agent 116 to unlock or lock the screen of the remote desktop 106. In an example, the desktop agent 108 on the client device 104 issues the authentication command to lock/unlock the remote desktop 106 using a Representational State Transfer (REST) API. Other examples may issue the authentication command in alternative ways.

Figure 3:
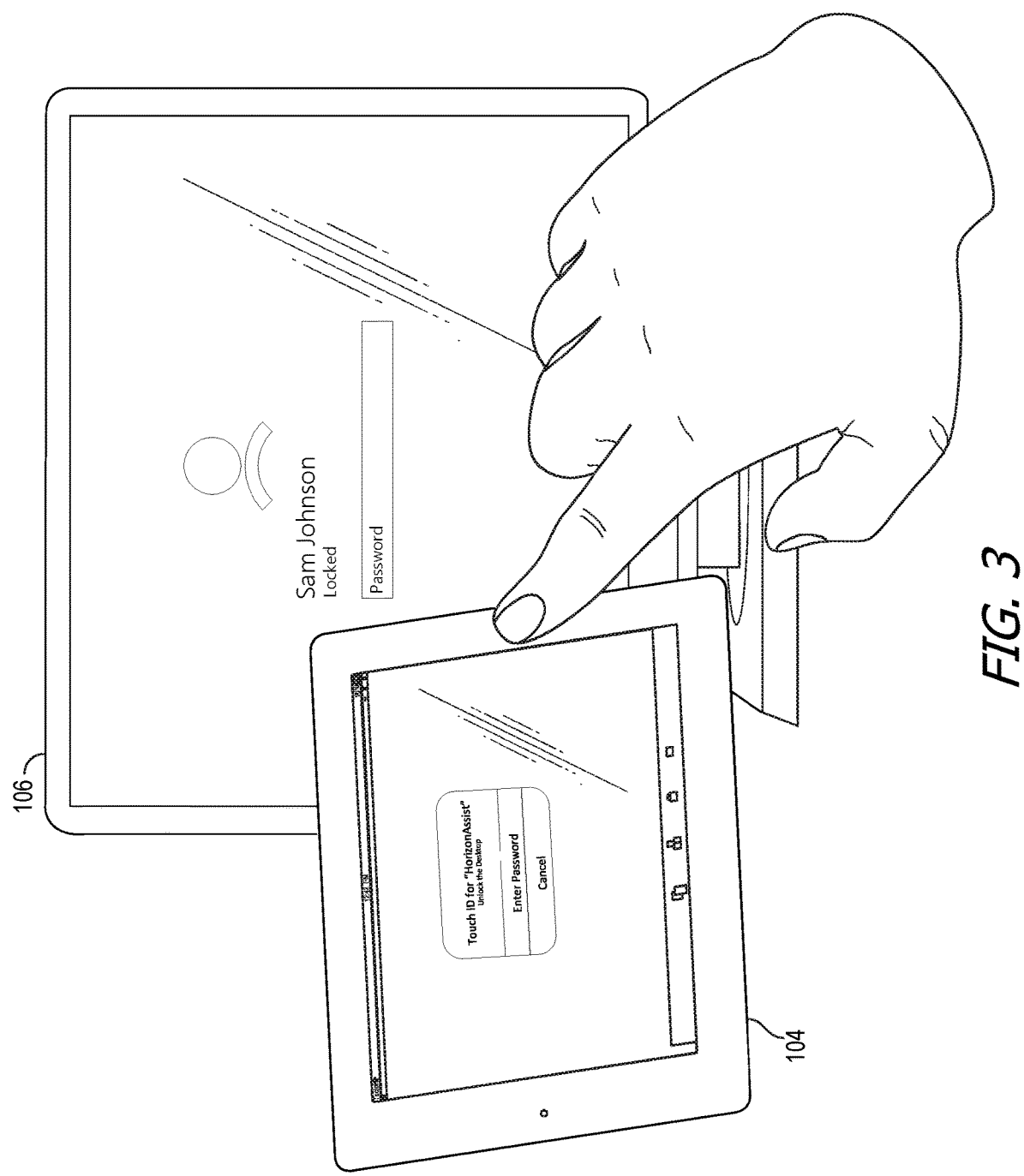
FIG. 3 illustrates an example user interface for the mobile device authentication techniques disclosed herein.

FIG. 3 illustrates an example user interface for the mobile device authentication techniques disclosed herein. FIG. 3 shows a user being authenticated to a client device 104 using a fingerprint scanner, and the authentication on the client device 104 is used to remotely control the locking or unlocking of the remote desktop 106. The client device, in some examples, is a cellular telephone, smart phone, smart watch, tablet, fob, or any other device able to authenticate a user. In some examples the client device includes technology to recognize: fingerprint, username and password, facial recognition, input of mobile device passcode, voiceprint, pattern or sequence, etc. In other examples the client device is wirelessly enabled, and carried by a user. The client device itself, in that example, acts as the authentication. The remote desktop 106 includes traditional desktop computing systems, as well as virtual desktops. The remote desktop, in some examples, is connected to a network, or it is standalone. In some examples the remote desktop 106 is a terminal, upon which a virtual desktop or virtual machine is instantiated upon request or upon unlocking. Alternatively, a virtual machine is suspended or resumed based upon a mobile device authentication attempt.

Figure 4:
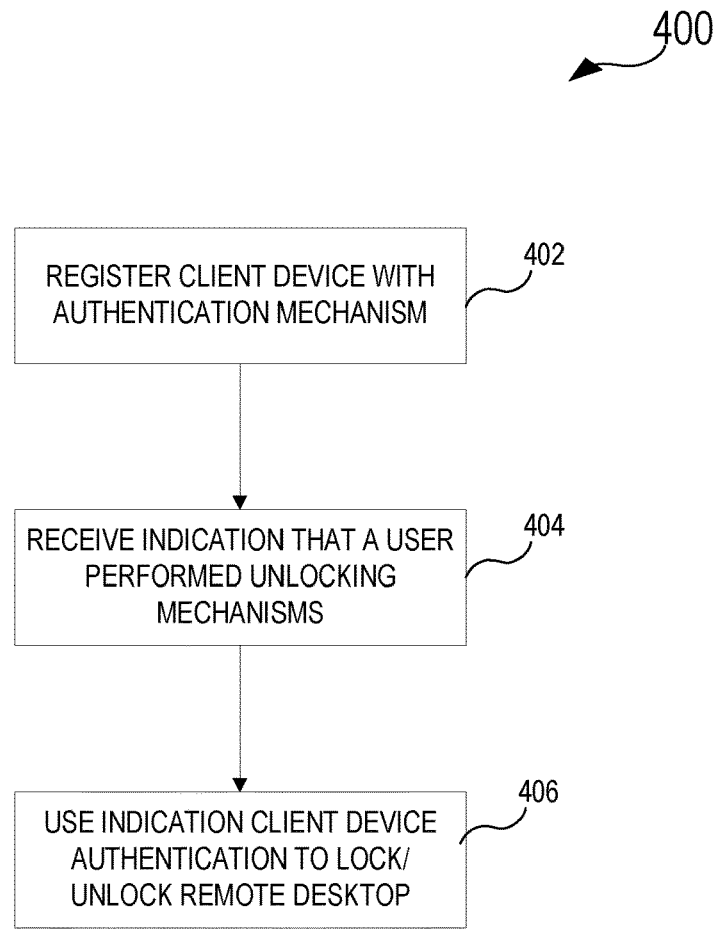
FIG. 4 depicts a simplified flowchart of a method for mobile device authentication.

FIG. 4 depicts a simplified flowchart of a method for mobile device authentication. A client device 104 is initially registered with the remote desktop 106 for using the client device's authentication mechanism (e.g., biometric scan, passcode, gesture, username and password, etc.) to unlock the remote desktop, as indicated at block 402. The registration is described in more detail in FIG. 5. An indication that a user performed an unlocking mechanism on the client device 104 is received, as shown at block 404. The client device 104 unlocking mechanism is then used to either lock or unlock the remote desktop 106, as indicated at block 406, and described in more detail in FIG. 6. In other words, the remote desktop 106 is unlocked or locked based on the user being authenticated to the client device 104. In some examples the indication is an authorized indication (recognized as valid either by the client device 104 or the remote desktop 106). Alternatively, an indication is unauthorized, and not recognized by either device.

Figure 5:
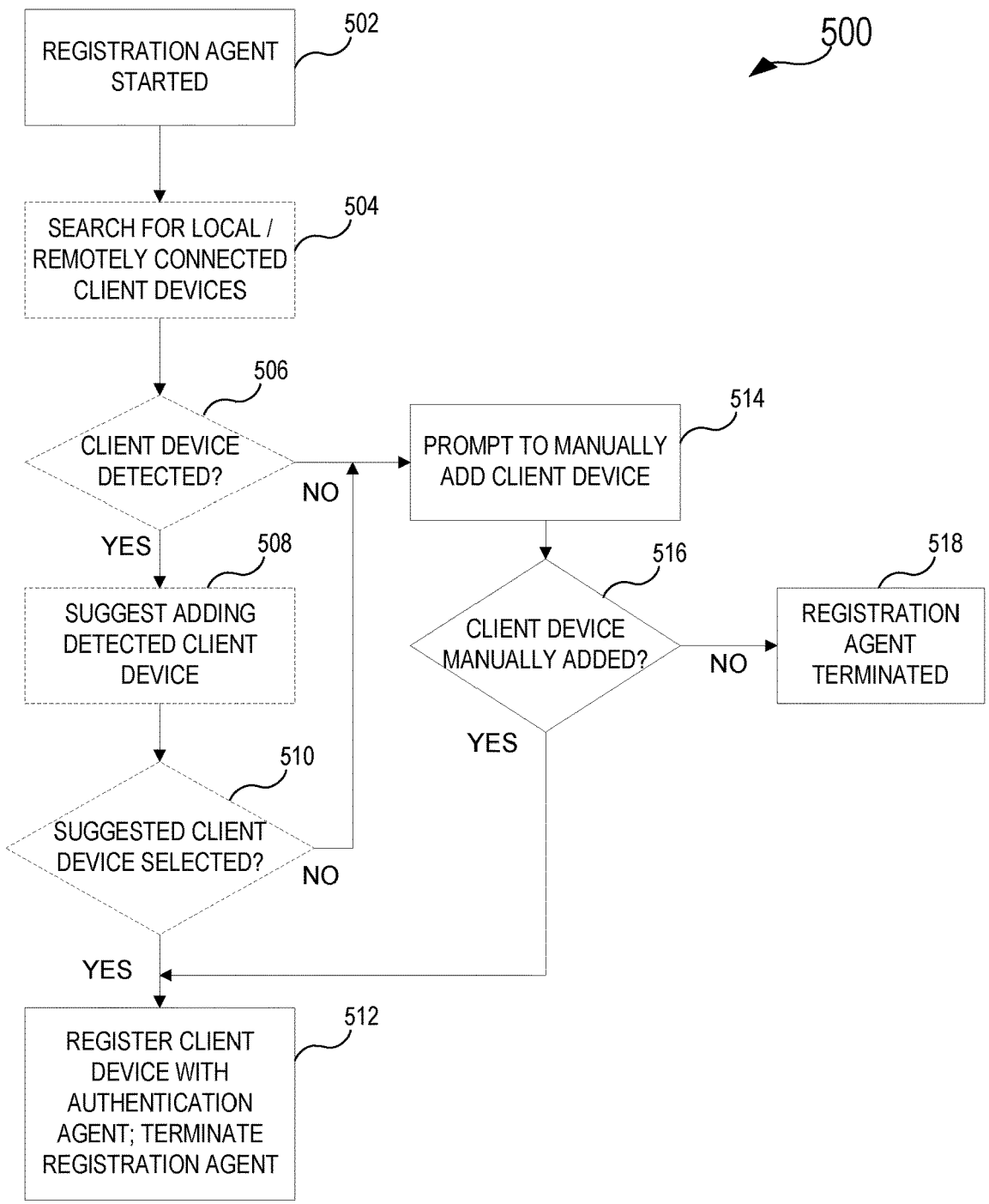
FIG. 5 depicts a flowchart of a method for adding a client device and an associated authentication mechanism to a desktop authenticator operating on the remote desktop.

FIG. 5 depicts a flowchart of a method for adding a client device and an associated authentication mechanism to a desktop authenticator 112 operating on the remote desktop 106. At 502 the registration agent 114 is launched, executed, or started. In some examples, the registration agent 114 is running, already. At 504, the registration agent 114 optionally searches for locally or remotely connected client devices 104. In some examples, the registration agent 114 locates any client devices 104 which is wirelessly available, or which the registration agent 114 can "see" on a wireless network. Alternatively, the registration agent 114 searches the remote desktop 106 for details of known client devices 104. As an example, a client device 104 associated with an iTunes account is located by the registration agent 114. If client devices 104 are detected at 506, then the registration agent 114 suggests adding the detected client devices 104 at 508. In some examples, a list is presented to a user permitting the user to select client devices 104 to add to the authentication agent 116. At 510, if one or more of the suggested client devices 104 are added, then those client devices 104 are added to the authentication agent 116 at 512.

Adding the client device 104 to the authentication agent 116 includes, in some example, adding information about the authentication mechanism of the client device 104, and the authorized authentication data or authorized indication associated with the client device 104. In some examples, this may include facial recognition, voice recognition, fingerprint, username and password, gesture, or other identifying information. The data used to authenticate a user is referred to as authentication data or an "indication." An indication is either authorized (e.g., the indication is known and indicates authorized use) or unauthorized. Alternatively, in some examples, the authentication agent 116 stores no specific information about the authentication data associated with the client device 104 and only stores whether or not the client device 104 received the valid, correct authentication data. The registration agent 114 is also terminated upon registering the client device 104 with the authentication agent 116 at 512.

If, at 506 no client devices 104 are detected, or if none of the suggested client devices are selected at 510, then a user may be prompted to manually add or register a client device 104 at 514. Manually adding a client device 104 includes, in some examples, adding information associated with the client device 104, such as a telephone number, a mobile identification number (MIN), mobile subscription identification number (MSIN), mobile device identifier, device identifier, unique device identifier (UDID), etc. At 516, if the client device 104 is manually added, then the client device 104 is registered with the authentication agent 116 at 512, and the registration agent 114 terminates. If no client device 104 is added at 516, then the registration agent 114 terminates at 518.

Figure 6:
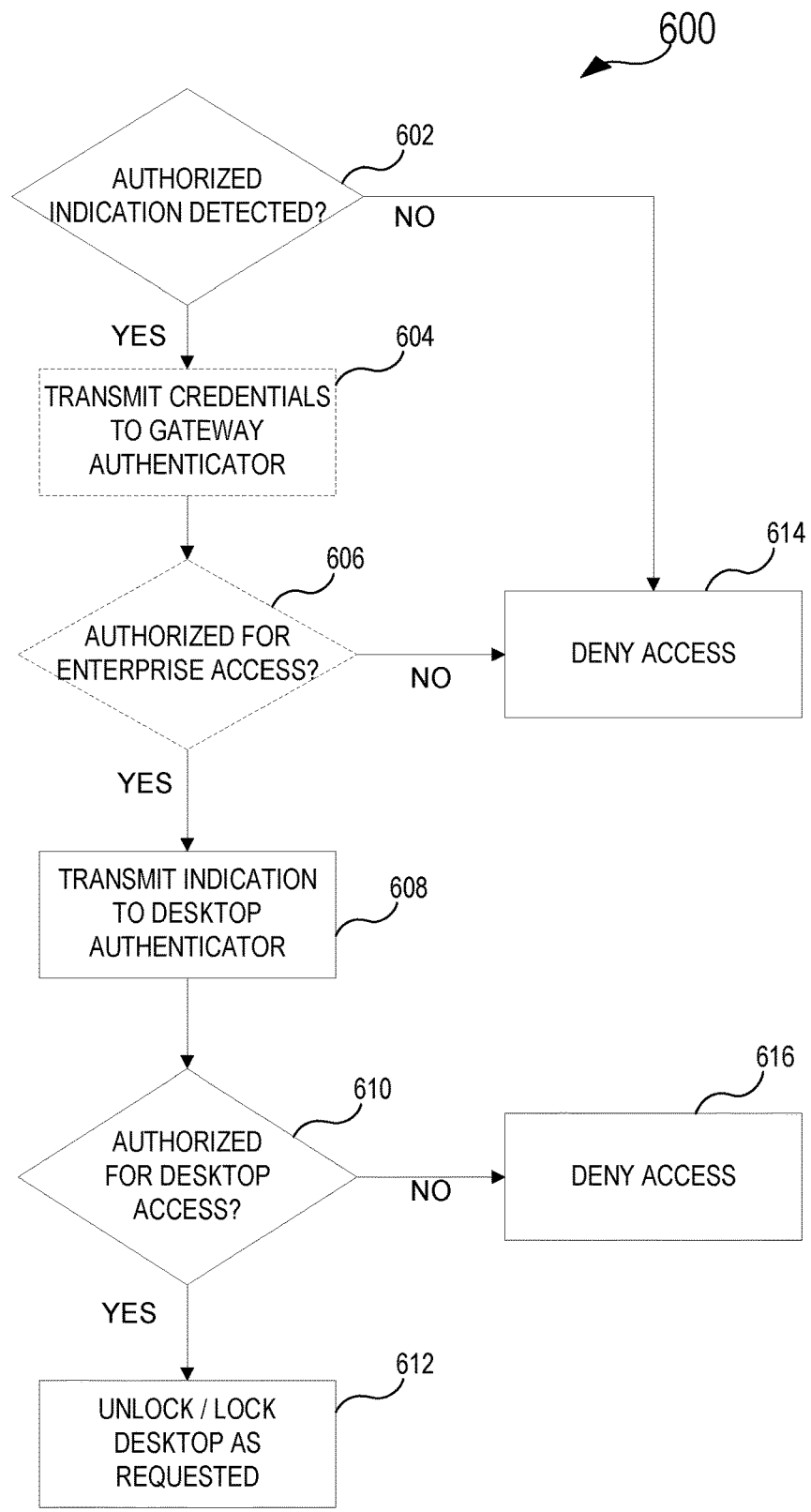
FIG. 6 depicts a more detailed flowchart of a method for mobile device authentication.

FIG. 6 depicts a more detailed flowchart of a method for mobile device authentication. At 602 the authentication mechanism of the client device 104 receives an indication or an unlocking indication. Examples of the authentication mechanism include, without limitation, a valid fingerprint scan, a retina scan, username and password, a passcode, voice recognition, a facial scan, a recognized gesture, or any other kind of authentication mechanism. Alternatively, a sequence of events acts as an authorized indication, if it satisfies a credential policy. As an example, if the client device detects a location change from "home" to "work," and then the client device detects that it is entering "the office," this sequence of events may act as an authorized indication to trigger the mobile desktop authentication system, either solely or in combination with the disclosed authentication mechanisms. Performing this sequence of events may identify the user, in accordance with the credential policy. Similarly, authentication may be disallowed when the user is not within a particular proximity to the remote desktop (e.g., within 5 meters). Thus, the location of the user may be used either to trigger a user to perform the authentication mechanism on the client device or as a condition for accepting a user's authentication.

If the indication is authorized on the client device 104, then in some examples the credentials of the client device 104 are transmitted to the gateway authenticator 120. The transmitted credentials include, as an example, a token previously provided by the desktop management server 102 to indicate that the client device 104 is authorized to access the enterprise system. If the authorized indication is not detected, then access is denied at 614. In some examples an administrator is notified if access is denied.

In some examples an unauthorized indication results in locking an unlocked remote desktop 106, locking the client device 104, or disabling the mobile device authentication system. In an example where credentials are transmitted to the gateway authenticator 120, the gateway authenticator 120 verifies that the client device 104 is authorized to access the enterprise system at 606. If the client device 104 is not authorized, then access is denied at 614. In some examples, the gateway authenticator 120 compares the client device 104 and the access details with an administrative policy such as an enterprise credential policy to determine whether they match known or accepted access details. The administrative policy includes, for example, rules about access levels, access frequency, user location, etc. If the client device 104 is authorized for enterprise access, or if operation 606 is not required, the receipt of the authorized indication is transmitted to the desktop authenticator 112 at 608. In some examples, the client device 104 is authorized for enterprise access based on the time of day (e.g. during their shift), the location of the client device (access not authorized if the client device is not within a range, such as 5 meters, of the remote desktop), etc. If the client device 104 satisfies all administrative policies locally on the remote desktop 106 at 612 then the remote desktop 106 is locked or unlocked as requested at 612. Otherwise access to the desktop through mobile device authentication is denied at 616.

Figure 7:
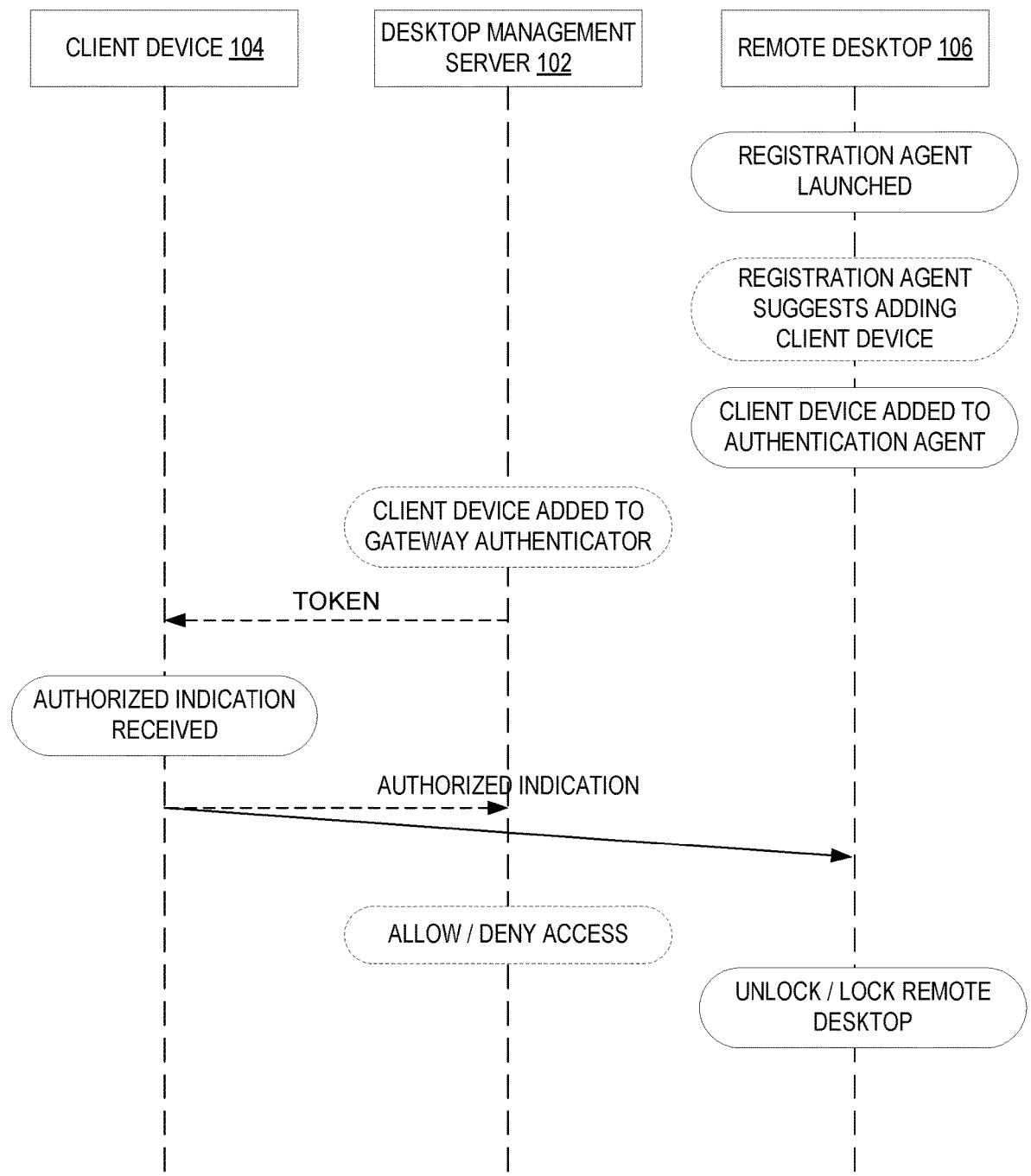
FIG. 7 shows a sequence diagram of the operations performed by the client device, the remote desktop, and in some examples the desktop management server during remote device authentication.

FIG. 7 shows a sequence diagram of the operations performed by the client device 104, the remote desktop 106, and in some examples the desktop management server 102 during remote device authentication. Initially the registration agent 114 is launched by the remote desktop 106. The operations involved in launching the registration agent 114, and adding a client device 104 to the authentication agent 116, are described in more detail in FIG. 4. Optionally, the registration agent suggests adding client devices 104 to the authentication agent 116. At least one client device 104 is added to the authentication agent 116. In some examples, the client device 104 is also added to the gateway authenticator 120. In examples utilizing the gateway authenticator 120, the client device 104 is provided with a token or other credential to use to access the desktop management server 102.

The authentication mechanism on the client device receives an indication (e.g., an attempt is made to access the client device 104 through the authentication mechanism). If the indication is authorized, then the authorized indication is passed to the remote desktop 106, and in some examples the desktop management server 102. Based, in some examples, upon administrative policies, the desktop management server 102 allows or denies access to the remote desktop by the mobile device authentication system. The remote desktop 106 is then locked or unlocked based upon the authorized indication.

Figure 8:
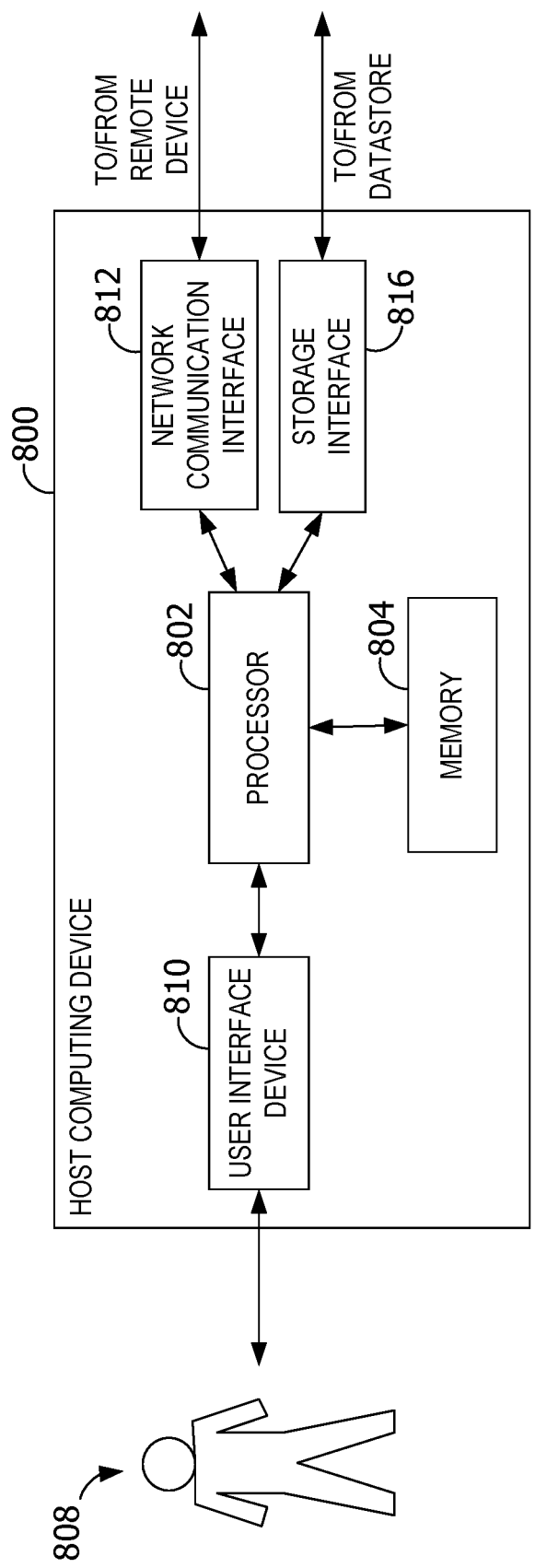
FIG. 8 is an example block diagram of a host computing device.

FIG. 8 is a block diagram of an example host computing device 800. Host computing device 800 includes a processor 802 for executing instructions. In some examples, executable instructions are stored in a memory 804. Memory 804 is any device allowing information, such as executable instructions and/or other data, to be stored and retrieved. For example, memory 804 may include one or more random access memory (RAM) modules, flash memory modules, hard disks, solid state disks, and/or optical disks.

Host computing device 800 may include a user interface device 810 for receiving data from a user 808 and/or for presenting data to user 808. User 808 may interact indirectly with host computing device 800 via another computing device such as a device running VMware's vCenter Server or other management device. User interface device 810 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 810 operates to receive data from user 808, while another device (e.g., a presentation device) operates to present data to user 808. In other examples, user interface device 810 has a single component, such as a touch screen, that functions to both output data to user 808 and receive data from user 808. In such examples, user interface device 810 operates as a presentation device for presenting information to user 808. In such examples, user interface device 810 represents any component capable of conveying information to user 808. For example, user interface device 810 may include, without limitation, a display device (e.g., a liquid crystal display (LCD), organic light emitting diode (OLED) display, or "electronic ink" display) and/or an audio output device (e.g., a speaker or headphones). In some examples, user interface device 810 includes an output adapter, such as a video adapter and/or an audio adapter. An output adapter is operatively coupled to processor 802 and configured to be operatively coupled to an output device, such as a display device or an audio output device.

Host computing device 800 also includes a network communication interface 812, which enables host computing device 800 to communicate with a remote device (e.g., another computing device) via a communication medium, such as a wired or wireless packet network. For example, host computing device 800 may transmit and/or receive data via network communication interface 812. User interface device 810 and/or network communication interface 812 may be referred to collectively as an input interface and may be configured to receive information from user 808.

Host computing device 800 further includes a storage interface 816 that enables host computing device 800 to communicate with one or more data storage devices, which store virtual disk images, software applications, and/or any other data suitable for use with the methods described herein. In example examples, storage interface 816 couples host computing device 800 to a storage area network (SAN) (e.g., a Fibre Channel network) and/or to a network attached storage (NAS) system (e.g., via a packet network). The storage interface 816 may be integrated with network communication interface 812.

Figure 9:
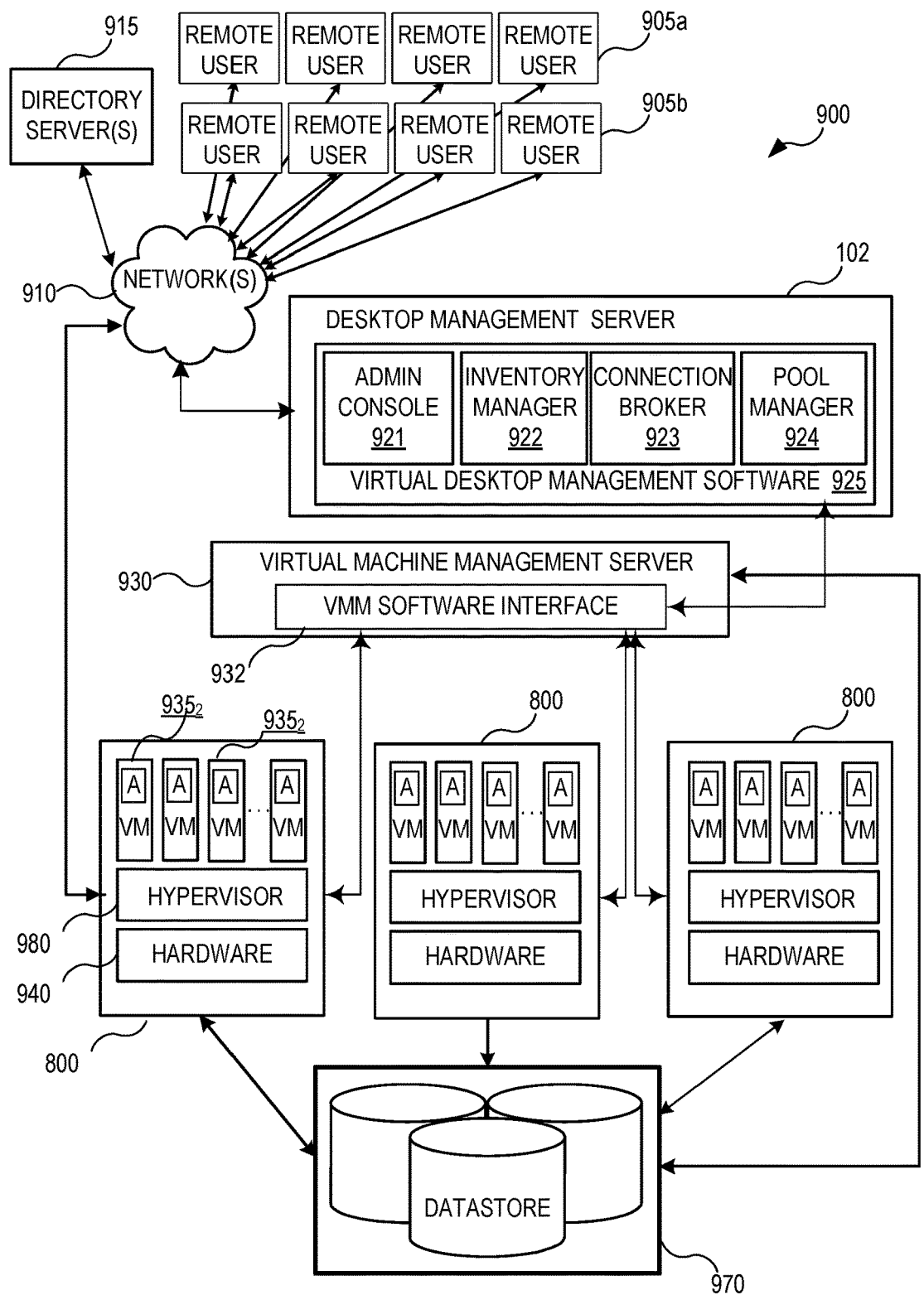
FIG. 9 is a block diagram of an example general virtualized machine architecture environment for executing the described mobile device authentication.

FIG. 9 is a block diagram of an example general virtualized machine architecture environment for executing the described mobile device authentication. The following architecture may be used in a remote desktop session and may be enhanced to use the client services interface to have services performed and return result sets for display using native viewers. As shown in FIG. 9, in traditional use, remote users, for example users 905a and 905b, may access centrally-managed remote desktops 106, such as those implemented by virtual machines 935 running in a datacenter, using network 910 (e.g., a local area network, or other private or publically accessible wide area network, such as the Internet) through any number of different types of devices. These virtual machines (VMs) 935 are complete computation environments, containing virtual equivalents of the hardware and system software components of a physical system as described above, and are typically implemented by an extensive virtualization infrastructure, which includes a variety of software and hardware components.

Remote access to remote desktops is generally provided to client devices through a desktop management server 102. Desktop management server 102 provides access to remote desktops by the remote user devices, and manages the corresponding virtual machines through communications with a software interface 932 of a Virtual Machine Management Server (VMMS) 930. The Virtual Machine Management Server (VMMS) 930 is responsible for provisioning and maintaining the multitude of Virtual Machines (VMs) 935 implemented across potentially a multitude of physical computers, such as host computing devices 800. When a user wishes to access an existing virtual machine, the user establishes a connection through the desktop management server 102, and a remote desktop is presented (as a user interface) on the user's client device, through which communications are made with the underlying virtual machine. Additionally, the virtual machine may include a proxy services agent 206 as described above with reference to FIGS. 1 and 4 to perform service requests.

In the example shown, each physical computer, for example computer 800 contains the underlying hardware 940, virtualization software (here a hypervisor 980), and one or more virtual machines, for example VM 935$_1$ and VM 935$_2$, which each contain Agent Software (guest system software) labeled here as "A" in each VM box. The Agent Software is typically responsible for connecting each VM to the desktop management server 102 and manages each desktop connection. It typically notifies the desktop management server 102 upon each login, logoff, and disconnect. The Agent Software also provides support for remote devices such as universal serial bus (USB) devices, etc. The Agent Software may also be enhanced to include proxy services agent 206 and service plug-ins 112.

The VMMS 930 typically manages pools of compute resources used to run virtual machines on a set of clusters typically containing multiple servers with CPUs, memory, and communications hardware (network). A virtual computer (a virtual machine or VM), when active, consumes physical computer resources and is managed by a hypervisor layer, such as hypervisor 980 running on physical computer 800. The hypervisor manages physical resources as well as maintains virtual-to-physical hardware mappings. The Software Interface 932 running on the VMMS 930 communicates with these hypervisors (e.g., hypervisor 980) to provision and manage each VM 935. For example, according to traditional virtualization techniques, when a remote user (e.g., user 905*a*) requests access to a particular existing desktop, the desktop management server 102 (through its software 925), communicates with the VMMS through its software interface 932 to start the corresponding VM 935 executing on an appropriate physical computer, and to relay the user interface exported by the VM 935 to the remote user so that the user can interact with the remote desktop 106. In some instances (e.g., according to administrator policies), when the desktop is exited, or otherwise shutdown, the desktop management server 102 communicates with the VMMS 930 to save the VM image to the datastore 970 as appropriate and to de-allocate physical and VM system resources as needed.

In general, the VMMS Server 930 provides interfaces 932 to enable other programs, such as the Pool Manager 924, to control the lifecycle of the various virtual machines that run on a hypervisor. In one example of an existing virtualization infrastructure provided by VMware Inc., desktop management server 102 includes an Administrative Console 921, an Inventory Manager 922, a Connection broker 923, and a Pool Manager 924. The Connection broker 923 allows a remote user, such as remote user 905*a*, through client device 104, to initiate a desktop session with an assigned VM 935 or to access an existing connection to VM 935. Connection broker 923 may also be enhanced to include remote desktop gateway 118.

The Inventory Manager 922 maintains a mapping of different user belongings in the system. For example, user may be entitled to certain applications; may have access to more than one desktop, etc. The Inventory Manager 922 also keeps track of the running remote desktops in the system. The mappings may be stored using any number of mechanisms, including using one or more directory servers 915 accessible through network 910.

The Pool Manager 924 component manages the complete lifecycle of remote desktops. Desktops in a pool are grouped together based on similar software requirements. Desktop Administrators create logical desktops groups (desktop pools) that are provisioned typically from the same base image, including the Agent Software. For example, a desktop pool may include virtual machines that run the same set of software applications and run the same operating system. As yet another example, a desktop pool may contain a set of cloned virtual machines that are identical in every aspect but are customized to include unique identity that includes for example, a unique computer name, IP/MAC Address, Domain membership, Software license serial numbers, OS specific security identifiers among other things. The base image can be a virtual machine or a template virtual machine that is created and/or managed by the VMMS 930.

The software state of all the virtual machines 935 in a desktop pool may be persistent or non-persistent. Persistent desktops maintain the state of the files or applications stored inside the virtual machines. Non-Persistent desktops are stateless desktops; the desktop state is restored to the original state after every user session. In some cases, the Desktop Administrator can define how frequently the "revert to golden state" operation should be performed. The restore to pristine image or revert to golden state operation can also be scheduled to occur based on certain conditions.

The Administrative Console 921 typically provides a user interface for a Desktop Administrator to manage the configuration of desktop pools, define user access policies, manage ongoing maintenance, software installed in the desktops, etc.

The Directory Server 915 stores the persistent state required for managing the remote desktops. For example, the VMs in a desktop pool maybe associated with one or more users. The user identifiers for a pool may be stored in the directory server 915. The users may also be referenced through an external directory server such as—Microsoft Active Directory, Novell eDirectory, IBM Tivoli Directory Server, etc.

The illustrated virtualization architecture is shown using a hypervisor-centric model. Alternative examples may control some or all of the VMs 935 in a virtualization architecture that uses containers instead of hypervisors. Yet, other examples may manage the depicted VM environment with unikernels. Thus, the illustrated virtualization architecture is but only one configuration for implementing the various examples disclosed herein.

Examples are not limited to being executed in virtualized environments, however. The disclosed examples may be run simply between desktop, server, and client mobile devices in a public or private network environment.

In some examples, executable instructions are stored in a memory. Memory is any device allowing information, such as executable instructions and/or other data, to be stored and retrieved. For example, memory may include one or more random access memory (RAM) modules, flash memory modules, hard disks, solid state disks, and/or optical disks.

Additional Examples

In some examples, a system includes a desktop agent 108 that cooperates with a mobile agent to provide a range of augmented services to desktop users, allowing the mobile device to function as an extension of the desktop for designated tasks. In some examples, the multiple helper devices are registered simultaneously to the desktop for purposes of serving as augmentations to user productivity or enhancements to user experience. In some examples, a user can authenticate to a remote desktop 106 session using the touch-ID capability of a mobile device such as an Apple iPad or iPhone, or wearable watch. In some examples, a user may lock or unlock the desktop's screen using Touch-ID.

In some examples, a non-desktop device such as a touch-ID fingerprint device is used to authenticate and unlock the desktop operating system.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more examples may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the operations. The various examples described herein may also be practiced with other computer system configurations including handheld devices, microprocessor systems, microprocessor-based or programmable consumer electronics, minicomputers, mainframe computers, and the like.

The examples illustrated and described herein as well as examples not specifically described herein but within the scope of aspects of the disclosure constitute exemplary means for mobile desktop authorization. For example, the elements illustrated in the figures, such as when encoded to perform the operations illustrated in the figures, constitute exemplary means for implementing the operations recited in the Claims and/or otherwise described herein.

One or more examples may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various examples, implemented as hosted examples, non-hosted examples or as examples that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or the like in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

These and other variations, modifications, additions, and improvements may fall within the scope of the appended claims(s). As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various examples of the present invention along with examples of how aspects of the present invention may be implemented. The above examples and examples should not be deemed to be the only examples, and are presented to illustrate the flexibility and advantages of the present invention as defined by the following claims. Based on the above disclosure and the following claims, other arrangements, examples, implementations and equivalents may be employed without departing from the scope of the invention as defined by the claims.

We claim:

1. A method, comprising:
prior to authorizing a client device to access a desktop:
registering the client device with an authentication agent of the desktop, the authentication agent obtaining information for an authentication mechanism from the client device, the authentication mechanism configured to authenticate a user on the client device to unlock the desktop, the desktop hosted by a hypervisor running on the client device;
receiving an indication on the client device corresponding to the authentication mechanism;
determining that the indication is an authorized unlocking indication;
upon determining that the indication is an authorized unlocking indication, transmitting client device credentials to a desktop management server, wherein the desktop management server is configured to compare the client device credentials with an enterprise administrative policy to determine whether the client device satisfies the enterprise administrative policy, the enterprise administrative policy comprising the client device being within (i) a given location and (ii) a time of day at which the indication is received; and
upon the client device being determined to satisfy the enterprise administrative policy, transmitting the authorized unlocking indication from a desktop agent of the client device to the desktop in a side channel between the desktop agent and the desktop, the side channel authorized for non-display traffic by the desktop management server, wherein the desktop is configured to determine that the client device has been registered with the authentication agent, and determine, based on the authorized unlocking indication, whether the client device is authorized to access the desktop, before unlocking the desktop.

2. The method of claim 1, wherein the client device is provided with a token to access the desktop management server.

3. The method of claim 1, wherein the indication comprises sequentially touching specifically displayed elements on the client device.

4. The method of claim 1, wherein the enterprise administrative policy includes rules associated with one or more of an access level and an access frequency.

5. The method of claim 1, wherein the authentication mechanism includes one or more of a thermogram and gait recognition.

6. The method of claim 1, wherein the indication includes a sequence of a plurality of related events that satisfies the enterprise administrative policy.

7. The method of claim 1, further comprising:
receiving the indication on a smart watch; and
transmitting the indication from a smart phone to the desktop to unlock the desktop.

8. The method of claim 1, wherein authenticating the user on the client device includes receiving authentication data comprising one or more of voice recognition information and facial recognition information.

9. A system, comprising:
one or more memories storing computer-executable instructions; and
one or more processors operationally coupled to the one or more memories and configured to execute the computer-executable instructions to:
prior to authorizing a client device to access a desktop:
register the client device with an authentication agent of the desktop, the authentication agent obtaining information for an authentication mechanism from the client device, the authentication mechanism configured to authenticate a user on the client device unlock the desktop, the desktop hosted by a hypervisor running on the client device;
receive an indication, on the client device, corresponding to the authentication mechanism;
determine that the indication is an authorized unlocking indication;
upon determining that the indication is an authorized unlocking indication, transmit client device credentials of the client device to a desktop management server, wherein the desktop management server is configured to compare the client device credentials with an enterprise administrative policy to determine whether the client device satisfies the enterprise administrative policy, the enterprise administrative policy comprising the client device being within (i) a given location and (ii) a time of day at which the indication is received; and
upon the client device being determined to satisfy the enterprise administrative policy, transmit the authorized unlocking indication from a desktop agent of the client device to the desktop in a side channel between the desktop agent and the desktop, the side channel authorized for non-display traffic by the desktop management server, wherein the desktop is configured to determine that the client device has been registered with the authentication agent, and determine, based on the authorized unlocking indication, whether the client device is authorized to access the desktop, before unlocking the desktop.

10. The system of claim 9, wherein the client device is provided with a token to access the desktop management server.

11. The system of claim 9, wherein the indication comprises sequentially touching specifically displayed elements on the client device.

12. The system of claim 9, wherein the indication includes a sequence of a plurality of related events that satisfies the enterprise administrative policy.

13. The system of claim 9, wherein the authentication mechanism includes one or more of: a thermogram and gait recognition.

14. The system of claim 9, wherein authenticating a user on a client device includes receiving authentication data comprising one or more of voice recognition information and facial recognition information.

15. A non-transitory computer-storage memory embodied with instructions executable by one or more processors to enable remote authentication of a desktop by a client device, the instructions comprising:
prior to authorizing the client device to access a desktop:
registering the client device with an authentication agent of the desktop, the authentication agent obtaining information for an authentication mechanism from the client device, the authentication mechanism configured to authenticate a user on the client device to unlock the desktop, the desktop hosted by a hypervisor running on the client device;
receiving an indication on the client device corresponding to the authentication mechanism;
determine whether the indication is an authorized unlocking indication;
upon determining that the indication is an authorized unlocking indication, transmitting client device credentials to a desktop management server, wherein the desktop management server is configured to compare the client device credentials with an enterprise administrative policy to determine, whether the client device satisfies the enterprise administrative policy, the enterprise administrative policy comprising the client device being within (i) a given location and (ii) a time of day at which the indication is received; and
upon the client device being determined to satisfy the enterprise administrative policy, transmitting the authorized unlocking indication from a desktop agent of the client device to the desktop in a side channel between the desktop agent and the desktop. the side channel authorized for non-display traffic by the desktop management server, wherein the desktop is configured to determine that the client device has been registered with the authentication agent, and determine, based on the authorized unlocking indication, whether the client device is authorized to access the desktop, before unlocking the desktop.

16. The non-transitory computer-storage memory of claim 15, wherein the client device is provided with a token to access the desktop management server.

17. The non-transitory computer-storage memory of claim 15, wherein the instructions further cause disabling of the client device from locking or unlocking the desktop on condition that the client device credentials are determined to be unauthorized.

18. The non-transitory computer-storage memory of claim 15, wherein the enterprise administrative policy includes rules associated with one or more of an access level and an access frequency.

19. The non-transitory computer-storage memory of claim 15, wherein the authentication mechanism includes one or more of: a thermogram, and gait recognition.

20. The non-transitory computer-storage memory of claim 19, wherein authenticating a user on a client device includes receiving authentication data comprising one or more of voice recognition information and facial recognition information.

21. The method of claim 1, wherein the hypervisor is a Type 2 hypervisor.

22. The method of claim 1, further comprising:
receiving, at the desktop agent, a results set from the desktop in the side channel, where the results set includes a result of authenticating the user to unlock the desktop.

* * * * *